US010416345B2

(12) United States Patent
Meyer

(10) Patent No.: US 10,416,345 B2
(45) Date of Patent: Sep. 17, 2019

(54) DE-CENTRALIZED CONTROL ARCHITECTURE FOR IMPROVED SENSITIVITY OF ACCELEROMETER-BASED GRAVITY GRADIOMETERS

(71) Applicant: Lockheed Martin Corporation, Bethesda, MD (US)

(72) Inventor: Thomas J. Meyer, Marilla, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 469 days.

(21) Appl. No.: 15/358,694

(22) Filed: Nov. 22, 2016

(65) Prior Publication Data

US 2017/0299767 A1 Oct. 19, 2017

Related U.S. Application Data

(62) Division of application No. 14/185,634, filed on Feb. 20, 2014, now Pat. No. 9,519,076.

(51) Int. Cl.
*G01V 7/00* (2006.01)
*G01P 15/13* (2006.01)
*G01P 15/125* (2006.01)

(52) U.S. Cl.
CPC .............. *G01V 7/00* (2013.01); *G01P 15/125* (2013.01); *G01P 15/132* (2013.01)

(58) Field of Classification Search
CPC . G01V 7/00; G01V 7/16; G01V 7/005; E21B 43/16; E21B 43/24; E21B 47/00; G01P 15/125; G01P 15/132
See application file for complete search history.

(56) References Cited

U.S. PATENT DOCUMENTS 5,357,802 A  10/1994 Hofmeyer et al.
5,734,104 A   3/1998 Panenka
(Continued)

OTHER PUBLICATIONS

International Search Report and Written Opinion for PCT/US2015/016863, dated Jun. 2, 2015, 7 pages.
(Continued)

*Primary Examiner* — Nathaniel T Woodward
(74) *Attorney, Agent, or Firm* — Withrow & Terranova, PLLC

(57) ABSTRACT

A method for rebalancing a group of accelerometers in a gravity gradiometer instrument (GGI) includes the steps of defining and implementing a number of groupwise actuation constrainment modes based on a design of the gravity gradiometer instrument and its accelerometers. Implementing one constrainment mode comprises differentially scaling and distributing a single electrical current to multiple accelerometers' rebalance circuitry to cancel a specific acceleration effect experienced by the group of accelerometers or gradiometer as a whole. Superposition of a number of such modes enables rebalancing the full acceleration environment experienced by the group of accelerometers, given negligible local differential acceleration effects specific to, say, an individual accelerometer of the assembly. Mathematically, the multiple of constrainment modes are encapsulated by an actuation or constrainment modal influence matrix, arranged one mode per column of the matrix, and the electrical currents of respective modes are encapsulated in a vector listing of currents.

10 Claims, 7 Drawing Sheets

(56) References Cited

U.S. PATENT DOCUMENTS

| | | | |
|---|---|---|---|
| 5,922,951 A * | 7/1999 | O'Keefe | G01V 7/16 |
| | | | 73/382 G |
| 5,962,782 A | 10/1999 | O'Keefe et al. | |
| 6,125,698 A | 10/2000 | Schweitzer et al. | |
| 9,519,076 B2 | 12/2016 | Meyer | |
| 2004/0231417 A1 | 11/2004 | Verysaskin | |
| 2006/0207326 A1* | 9/2006 | Moody | G01V 7/005 |
| | | | 73/382 R |
| 2012/0116707 A1 | 5/2012 | Malvern | |
| 2014/0000362 A1* | 1/2014 | DiStasio | G01V 7/00 |
| | | | 73/382 G |

OTHER PUBLICATIONS

International Preliminary Report on Patentability for International Patent Application No. PCT/US2015/016863, dated Sep. 1, 2016, 6 pages.
Notice of Allowance for U.S. Appl. No. 14/185,634, dated Jul. 29, 2016, 10 pages.

* cited by examiner

DE-CENTRALIZED CONTROL ARCHITECTURE FOR IMPROVED SENSITIVITY OF ACCELEROMETER-BASED GRAVITY GRADIOMETERS

RELATED APPLICATIONS

This application is a divisional of co-pending U.S. patent application Ser. No. 14/185,634, filed on Feb. 20, 2014, entitled "DE-CENTRALIZED CONTROL ARCHITECTURE FOR IMPROVED SENSITIVITY OF ACCELEROMETER-BASED GRAVITY GRADIOMETERS," which is hereby incorporated herein by reference in its entirety.

FIELD OF THE INVENTION

The application relates to the field of gravity gradiometer instruments (GGI).

BACKGROUND OF THE INVENTION

Gravity Gradiometer Instruments (GGI) are used to detect very small spatial variations (gradients) in the acceleration due to gravity. Gravity gradients are affected by non-uniform mass distributions. In one non-limiting example, GGIs are used in mineral and hydrocarbon exploration, where GGIs are used to survey above areas of the Earth's surface. Density variations in the subsurface rock formations, indicative of oil or gas deposits, create gravity gradients that are measurable by the GGIs, enabling the identification of subsurface prospects.

GGIs utilize one or more accelerometers which operate in combination to detect gravity gradients. Typically, e.g., in conventional configurations, the accelerometers are carefully arranged on a disk substrate about a rotational axis defined substantially at the center of the disk. The disk provides a known distance between accelerometers which can be used to calculate differences in acceleration experienced by different accelerometers. The differential accelerations are divided by the characteristic dimension or baseline to produce measured gravity gradients or a spatial difference over the known distance.

Gravity gradients are miniscule in comparison to other forces and accelerations to which the accelerometers are exposed. For example, in an application where the GGI is installed in an aircraft to perform an airborne survey, the motion of the aircraft exposes the accelerometers to kinematic accelerations which are many orders of magnitude larger than the differential accelerations associated with the gravity gradients that the GGI is intended to measure. Dynamic loading from the motion of the aircraft, its onboard vibration environment, or local dynamic deformations at an accelerometer mount location, as well as aspects of accelerometer resulting from its fabrication create additional complexities and accelerometer responses/outputs which must be addressed in order to identify the gravity gradients. If the raw output of the accelerometer was taken and digitized to produce an overall signal, the portion of the signal representing the differential acceleration owing to gravity gradients would be effectively lost due to the excessive disturbances of much greater magnitude than the gravity gradient-based accelerations. Therefore, these environmental disturbances must be identified and removed to leave the sought gravity gradient influence. In some applications, an electromagnet is placed within the path of a pendulum on which a proof mass is attached and swings in response to accelerations experienced by the accelerometer. A rebalancing current is generated based on an error voltage that is representative of the environmental error sources, and is applied to the electromagnet to constrain the pendulum mass in its proper position while under the influence of external forces.

The identification and removal of external forces presents challenges which when addressed, affect the sensitivity and bandwidth of the GGI. Gravity gradients are typically very low magnitude signals, while the error sources produce signals with much greater magnitudes. Furthermore, in a GGI having multiple accelerometers, each accelerometer is rebalanced individually, which further decreases the overall sensitivity of the GGI. In conventional GGIs, accelerometers are paired off and paired accelerometers are arranged on the disk opposite one another. These opposing output signals are added together in an attempt to cancel error signals which do not relate to gravity gradients. The configuration requires careful considerations regarding placement of the pairs of accelerometers. The disk is rotated, which modulates the sought differential accelerations associated with gravity gradients to a center frequency of twice the spin rate and simultaneously providing spectral separation from the common plumb gravity influence. Mechanization of the rotating structure introduces other sources of noise due to the rotational mechanism of the rotating disk. Improved mechanisms which rebalance a GGI having an arbitrary number of accelerometers are desired.

SUMMARY

A method for rebalancing a group of accelerometers in a gravity gradiometer instrument (GGI) includes the steps of defining and implementing a number of group-wise actuation constrainment modes based on a design of the gravity gradiometer instrument and its accelerometers. Implementing one single constrainment mode comprises differentially scaling and distributing a single electrical current to multiple accelerometers' rebalance circuitry to cancel a specific acceleration effect experienced by the group of accelerometers or gradiometers as a whole. Superposition of a number of such modes enables rebalancing the full acceleration environment experienced by the group of accelerometers, given negligible local differential acceleration effects specific to, for example, an individual accelerometer of the assembly. The multiple of constrainment modes are encapsulated by an actuation or constrainment modal influence matrix, arranged one mode per column of the matrix, and the electrical currents of respective modes are encapsulated in a vector listing of currents. A pickoff voltage modal influence matrix, which is nominally the transpose of the actuation modes matrix, is used to produce pickoff voltages corresponding to the modal participation of the group of accelerometers. A single such formed pickoff voltage is indicative of the level of respective acceleration effect experienced by the group of accelerometers.

DETAILED DESCRIPTION

Gravity gradiometer instruments (GGIs) typically include a number of accelerometers working in combination to produce an output signal that is representative of a low magnitude gravity gradient.

An exemplary gradiometer is shown in U.S. Pat. No. 5,357,802 issued Oct. 25, 1994 to Hofmeyer and Affleck entitled "Rotating Accelerometer Gradiometer", which is commonly owned by the assignee of the instant application, and which is incorporated herein by reference. A representative figure of such a structure is shown in FIG. 1.

Figure 1:
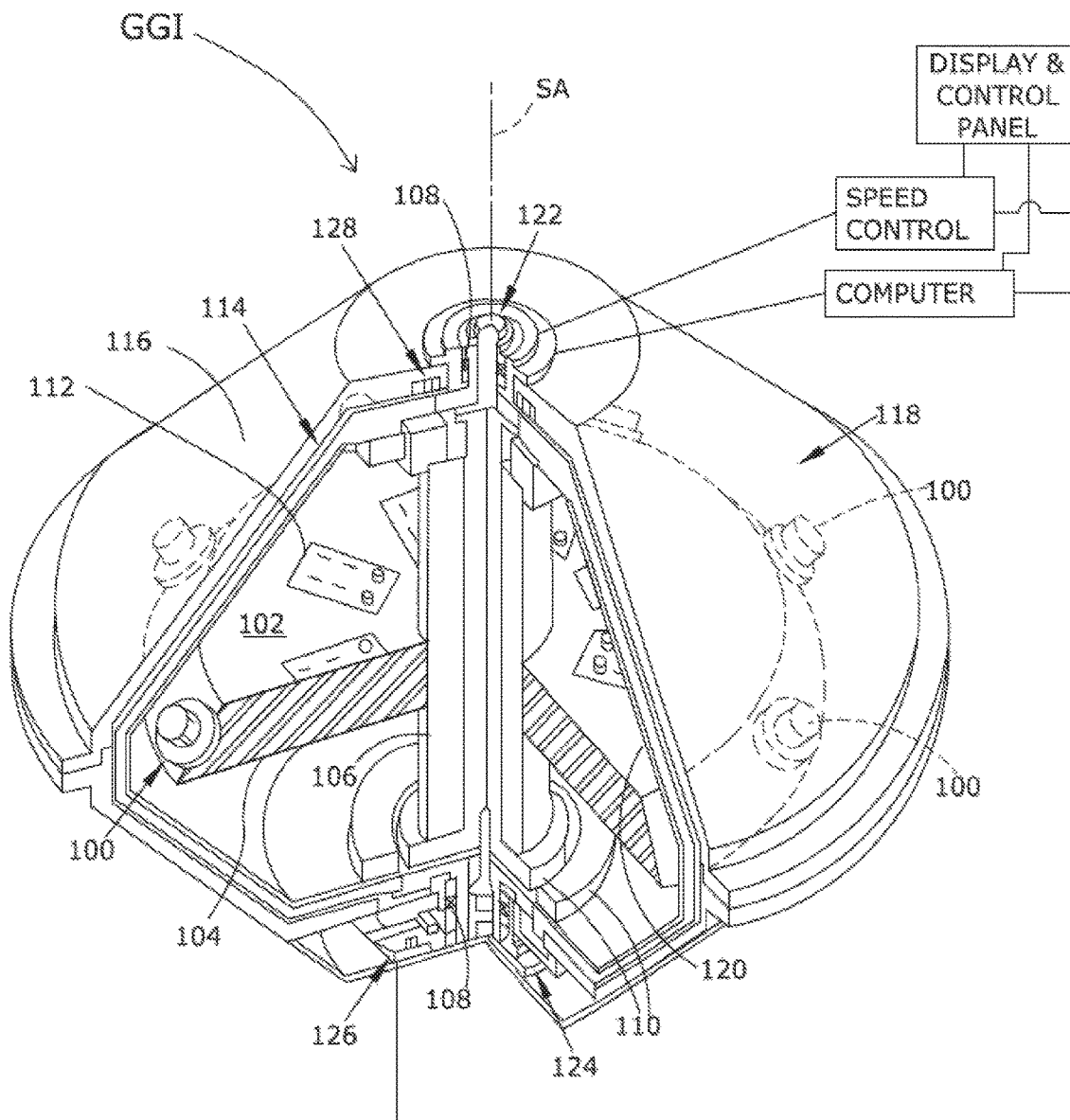
FIG. 1 is an isometric cutaway view of a prior art gravity gradiometer instrument having orbital accelerometers.

As shown in FIG. 1, the exemplary gravity gradiometer instrument (GGI) includes eight accelerometers 100 mounted at a common radius and equi-spaced about the periphery of a rotor assembly 102 that is rotated at a constant and controlled angular velocity about a spin axis SA; the mechanical movement of each accelerometer 100 as it orbits the spin axis SA imparts a sinusoidal component to the output of the accelerometer owing to gravity gradients at twice the rotational speed. The rotor assembly 102 includes the rotor 104 carried on a support shaft 106 for rotation therewith. The rotor assembly 102 is rotatably mounted on ball bearings 108 and, in turn, carried in a flex-mount assembly 110 and carried in a gyro-stabilized gimbal mount (not specifically shown). Processing electronics 112 are mounted on the rotor 104 adjacent each accelerometer 100 for processing the respective accelerometer output signal. An inner housing 114 contains the rotor assembly 102 and is designed to rotate with the rotor assembly 102. An outer housing 116 contains the interior components and includes one or more heaters 118 designed to operate the instrument at some controlled temperature above ambient and also includes a magnetic-field shield 120. A slip-ring assembly 122 at the upper end of the mounting shaft 106 provides the electrical/signal interface with the rotor assembly 102 and the active devices thereon. A shaft encoder 124 at the lower end of the mounting shaft 106 cooperates with an encoder pick-off 126 to provide rotary position information. The output of the encoder pick-off 126 is provided to a soft/firmware-controlled computer or microcomputer and speed controller, which, in turn, controls a drive motor 128 at the upper end of the unit to provide a controlled rotary velocity.

In the GGI of FIG. 1, the output of paired accelerometers 100 is summed and then differenced with summed values of other orthogonal accelerometer pairs. The difference waveform is then demodulated to remove sine and cosine values from the difference waveform. The sinusoidal modulation provided by the mechanical orbiting of the accelerometers about the spin axis is removed electronically via the demodulation step.

The gradiometer includes an internal linear servo controlled actuator that imparts a 2-Hz sinusoidal acceleration to each accelerometer pair to enable biasing and compensation of various errors including the $g^2$ ("g squared") rectification error. In addition, the gravity gradiometer GGI is mounted on an external vibration isolation system that assists in attenuating higher frequency vibration.

Each orbiting accelerometer 100 is of the force-rebalance type that provides an analog output that is a function of the total acceleration effect the accelerometer 100 experiences as it orbits the spin axis SA. For a gradiometer having its spin axis SA aligned along the field lines in an ideally uniform and unperturbed gravity field, each accelerometer 100 experiences the same acceleration forces as it proceeds along its orbital path. However, when the local gravity field is perturbed by the presence of one or more masses and/or the spin axis SA is tilted relative to the local vertical field lines, each accelerometer 100 will experience different accelerations throughout its respective orbit about the spin axis SA to provide a substantially sinusoidal varying output at a frequency twice its rotational speed.

Gradiometers have typically been positioned with their spin axis vertical (VSA—Vertical Spin Axis) and in a three-GGI cluster at an 'umbrella' angle in which the respective spin axes are tilted roughly 55 degrees from the local vertical, though any orientation is possible. The quantitative output of each rotating accelerometer pair, when summed and differenced (as shown, for example, in FIG. 5 of the above incorporated '802 patent), can be used to provide information related to the local gravity gradient field, primarily at frequencies twice the rotational speed of the gradiometer assembly about its spin axis.

In general, the mechanical modulation of the gradient signal consequent to the rotation of the accelerometers 100 about the spin axis SA imparts various kinds of noise into the gradient signal. This noise includes noise generated within the support bearings, minute variations in the rotational speed generated by the motor (and its drive electronics), small mis-alignments in the various components, and the changes thereof consequent with changes in operating temperature and dynamic motion inputs.

Figure 2:
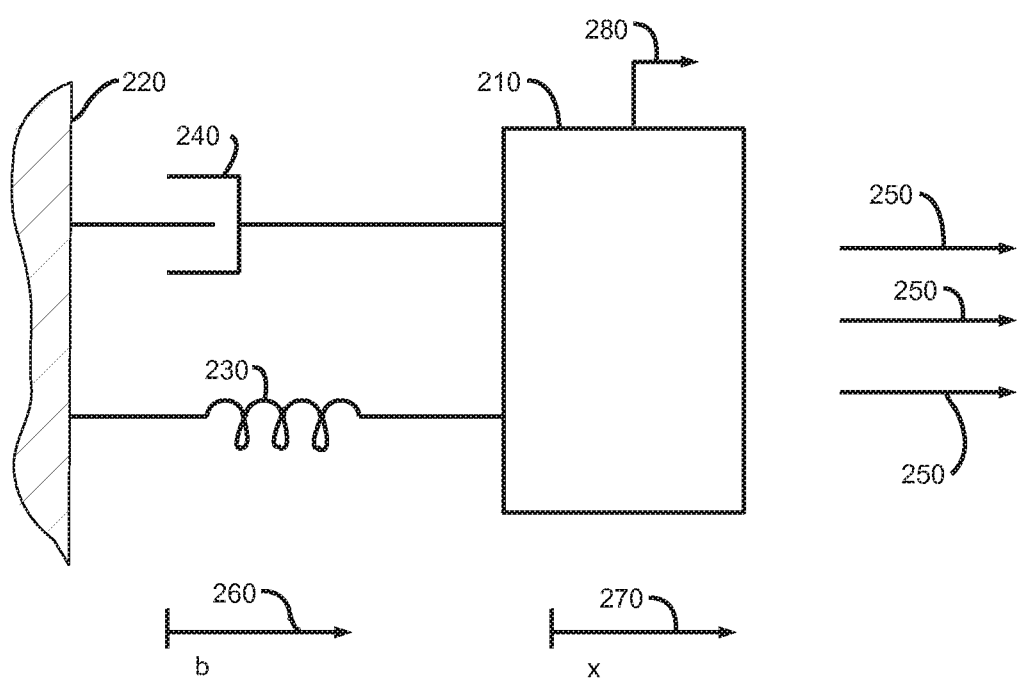
FIG. 2 is a schematic illustration of an accelerometer useful in a gravity gradiometer instrument according to an embodiment of the disclosure.

FIG. 2 is a simplified block diagram of an accelerometer that may be used in a GGI according to an embodiment of this disclosure. The accelerometer includes a proof mass 210 that is affixed to a housing 220 through a spring element 230. Motion is damped by several means including that owing to air drag as the proof mass 210 moves relative to the housing 220 through air molecules contained within the housing 220 and structural or material damping (e.g. molecular friction) intrinsic to the spring element 230 as it stretches and compresses. Collectively, these effects are commonly modeled or approximated as a viscous damping element 240. The component of gravity directed along the motion axis of the proof mass 210 is denoted 250. Inertial displacement of the housing 260 and inertial displacement of the proof mass 270 are indicated by their respective arrows, b and x. Thus, relative displacement of accelerometer 200 is the difference between the inertial displacement of the proof mass 270 minus the inertial displacement of the housing 260. Accordingly, $$x_r = x - b \qquad \text{(Equation 1)}$$

where $x_r$ is the relative displacement, x is the inertial displacement of the proof mass, and b is the inertial displacement of the housing.

The equation of motion for the sprung mass 210 is according to Equation 2:

$$\ddot{x}_r + 2\varsigma\omega_n\dot{x}_r + \omega_n^2 x_r = g - \ddot{b} + \frac{f_r}{m} \quad \text{(Equation 2)}$$

where
over-dot notation denotes time differentiation, once per demarcation; $\omega_n$ is the damping ratio;
$\varsigma$ is the natural frequency; and $$\omega_n^2 = \frac{k}{m}$$

$$2\varsigma\omega_n = \frac{c}{m}.$$

Under constant gravity influence and base acceleration, the relative displacement settles to a constant value which is directly measurable. Therefore, knowledge of the natural frequency of the suspension supporting the accelerometer 200 allows the inference of the value of gravity and base acceleration via:

$$g - \ddot{b} = \omega_n^2 x_r \quad \text{(Equation 3)}.$$

The gravity and base acceleration are indistinguishable or inseparable due to Newton's "Equivalence Principle". A measure of gravity could be obtained assuming the base acceleration is zero, or nearly zero when averaged over some (perhaps lengthy) period of time.

Alternatively, such a relative displacement of the sprung mass can be prevented by applying a rebalance force. The applied rebalance force $f_r$ may be measured as described in FIG. 3 hereinbelow, and is therefore known. Presuming the measured rebalance force prevents relative displacement, keeping $x_r=0$, this allows an ideal scenario in which gravity and base acceleration may be inferred from:

$$g - \ddot{b} = -\frac{f_r}{m}. \quad \text{(Equation 4)}$$

Figure 3:
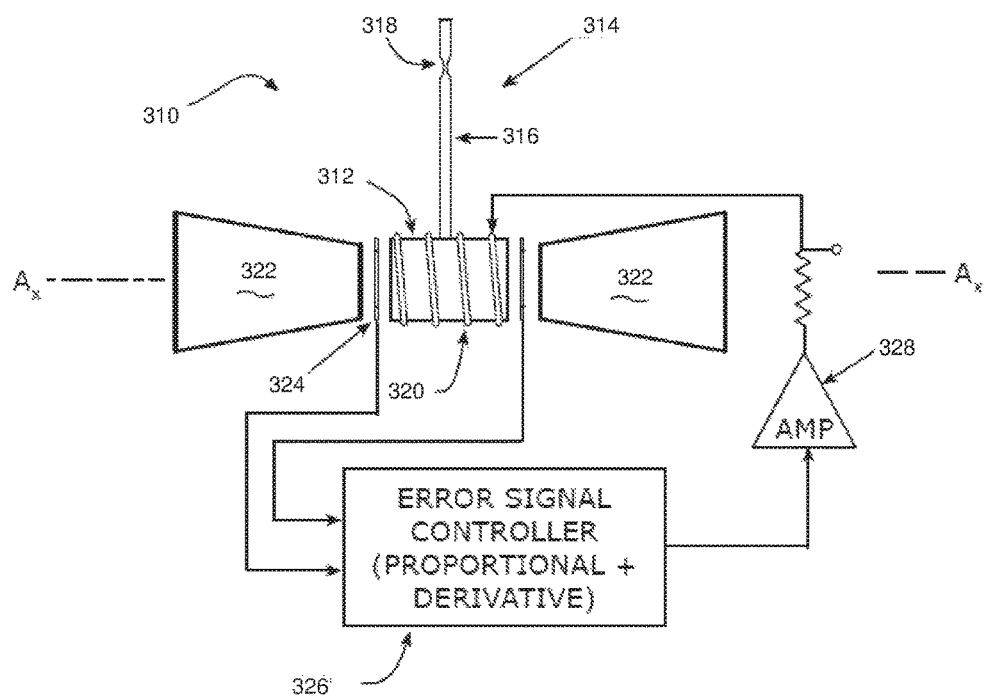
FIG. 3 is a block diagram of a rebalancing accelerometer with an error feedback rebalancing function.

FIG. 3 is an exemplary schematic representation of a force-rebalance accelerometer 310 shown in symbolic form in FIG. 3 showing some detail of the force rebalance mechanization and circuitry. As shown, and similar to that of FIG. 2, the accelerometer 310 includes a proof-mass 312 (preferably a non-magnetic material, such as ceramic) supported by a suspension system 314 at some null position. The suspension system 314 may take various forms including, for example, one or more beams 316 having a reduced cross-section hinge 318 to allow some bi-directional movement of the proof-mass 312 along the sensitive axis $A_x$ of the accelerometer 310. An electrical restoring coil 320 is wound about or mounted on or within the proof mass 312. One or more permanent magnets 322 provide a magnetic field that co-acts with a magnetic field generated by the passage of electrical current through the restoring coil 320. One or more capacitive pick-offs 324 provide information related to any displacement of the proof-mass 312 from its null position along the sensitive axis $A_x$ to a signal processor unit 326; the signal processor unit 326 typically includes a capacitive bridge to generate a capacitive difference error signal that is a function of the displacement of the proof-mass 312 from its null position and also includes circuitry to generate a voltage or current corresponding to the error signal that is amplified at some gain value via amplifier 328. If desired, filtering can be provided to eliminate or attenuate unwanted frequencies. The output of the amplifier 328 flows through the restoring coil 320 to create a magnetic field that co-acts with the magnetic field of the permanent magnets 322 to magnetically and proportionally bias the proof-mass 312 toward and to its null position to drive the sensed error toward zero or near zero. The magnitude of the current flow through the restoring coil 320 is related to any accelerations acting on the proof-mass 312 along the sensitive axis A.

The accelerometer arrangement shown in FIG. 3, when used in an orbiting accelerometer type device as shown in FIG. 1, includes a sinusoidal output signal content at a frequency twice the rotational speed as it orbits the spin axis with the amplitude of the alternations related to the gravity gradient. The sinusoidal signal includes content at various frequencies attributed to noise from the mechanical devices that implement the movement about the spin axis including motor noise, bearing noise, slip-ring noise, and noise from mechanical eccentricities, mis-alignments, imbalances, etc.

Figure 3A:
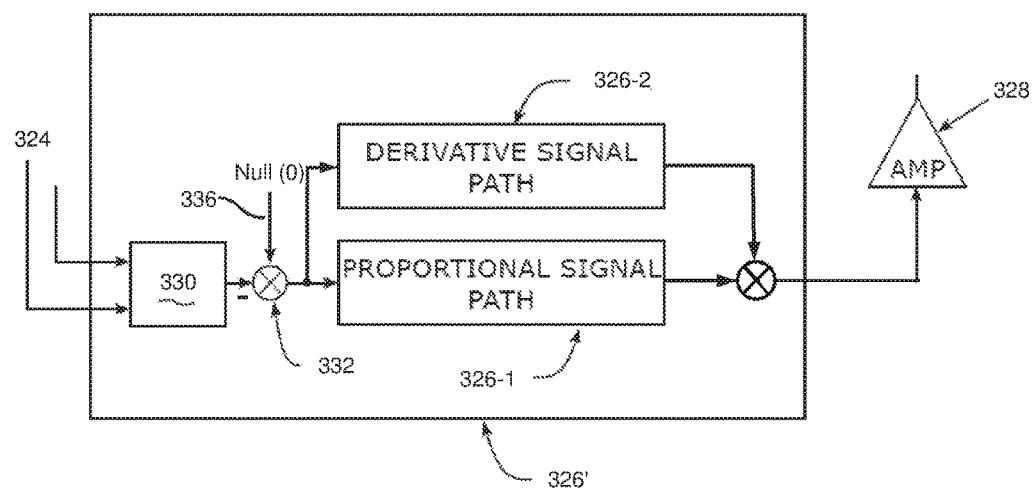
FIG. 3A is a block flow diagram of the error feedback rebalancing function of the rebalancing accelerometer of FIG. 3.

A non-limiting embodiment of a feedback loop function 326' that utilizes a proportional-plus-derivative (PD) constrainment loop is shown in FIG. 3 and FIG. 3A. While this embodiment is described in reference to a PD constrainment loop, this is not limiting. A person of skill in the art will recognize that other feedback mechanisms may be employed without departing from the intended scope of this disclosure. A PD control loop utilizes a term proportional to the derivative of the sensed error (i.e., a term related to the rate of change of the sensed error) which is added to a term proportional to the sensed error. The proportional-plus-derivative schema has the advantage of being somewhat anticipatory compared to a conventional proportional controller.

FIG. 3A is a functional block representation of the proportional-plus-derivative error signal controller 326'. As shown, the connections from the capacitive pick-offs (324 shown in FIG. 3) connect to a capacitive comparator 330 which may take the form of a multi-leg capacitor bridge that provides a voltage (or current) value indicative of the acceleration experienced by the proof-mass 312 (FIG. 3) along its sensitive axis A. This error signal is passed to a summing junction 332 where it is differenced with a null reference, i.e., the signal is inverted for use in a negative feedback arrangement. The resulting signal is provided to the proportional and derivative signal paths 326-1 and 326-2 where it may be subject to filtering to remove unwanted frequencies and scaled as appropriate. As a consequence, the restoring signal provided to the input of the amplifier 328 is a combination of the proportional component and the first derivative component to provide proportional-plus-derivative control of the restoring coil 320.

Figure 4:
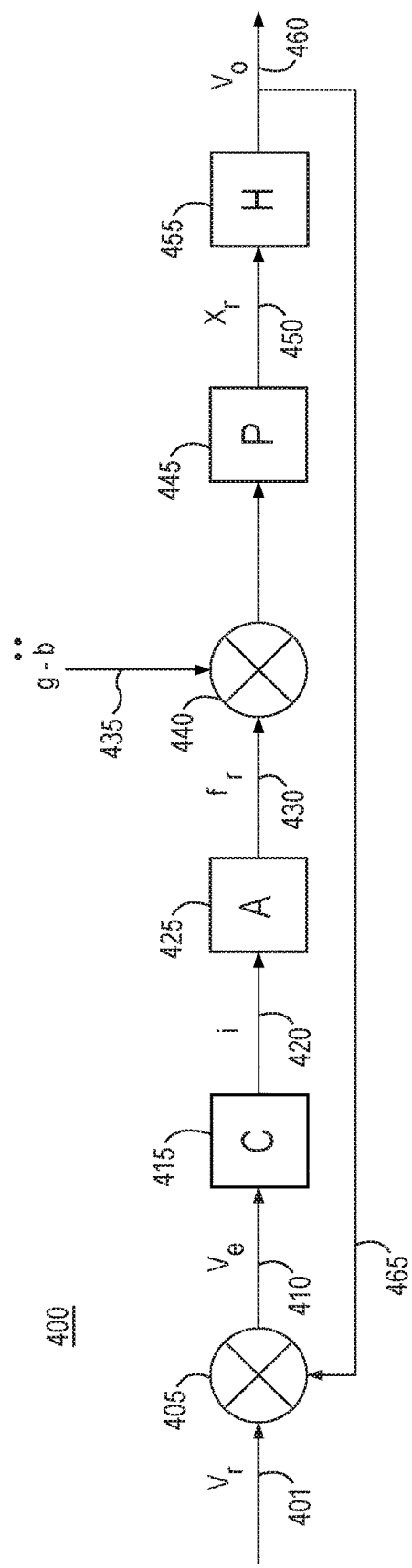
FIG. 4 is a block flow diagram of a rebalancing feedback control function for a single accelerometer as used in the art.

Referring now to FIG. 4, there is shown a block flow diagram of a rebalancing feedback control process 400 of an idealized rebalance accelerometer. The feedback control process 400 provides a rebalancing force $f_r$ 430 to constrain the accelerometer proof mass position at zero relative to its housing. The position of the proof mass relative to the accelerometer housing may be determined by any suitable means, including but not limited to, optical or electrical proximity sensing methods. When the proof mass is constrained in a position of zero displacement relative to its housing, it is considered to be at null, or simply nulled. Thus, an error condition may be considered a condition which creates a relative displacement of the proof mass or finite offset from null.

A reference command voltage $(v_r)$ 401 is applied to a comparator 405. For a load rebalance device the reference voltage is usually zero and the feedback control process referred to as a regulator. A pickoff output voltage ($v_O$) 460 is a voltage signal proportional to the relative displacement of the proof mass from null. The pickoff output voltage 460 is applied via feedback loop 465 and subtracted from the command voltage 401 in comparator 405. The subtraction of the pickoff output voltage 460 from the reference command voltage 401 results in error voltage ($v_e$) 410. The error signal is input to a constrainment circuit (C) 415 which implements the requisite signal conditioning and control logic in solid-state electronics components, typically, to provide a constrainment current (i) 420. The constrainment current 420 is applied to an actuator (A) 425 which provides the necessary rebalance force ($f_r$) 430 to the accelerometer plant (P) 445, which comprises a proof mass and spring suspension. The rebalance force 430 is combined at summer 440 with the force of the difference of the gravitation and base acceleration 435 and applied as an input to the accelerometer plant 445. The accelerometer output ($x_r$) 450 derived from the motion equation described in Equation 2 represents the relative displacement of the proof mass. Block (H) 455 represents a pickoff scale factor based on the proportional relationship of the accelerometer output 450 and the pickoff output voltage 460 as characterized by Equation 5:

$$v_O = H x_r.\qquad\text{(Equation 5)}$$

The pickoff scale factor may be embodied in differential capacitive bridge circuits (represented in FIG. 4 as block H, 455), and provides a means for generating a voltage signal based on the relative displacement, generally referred to as the device's pickoff. The generated voltage is proportional to the proof mass deviation from the sought after null position. The quantities described in regard to FIG. 4 pertain to a single accelerometer within a GGI and are therefore scalar values and functions, signals or parameters.

The feedback control process 400 of FIG. 4 shows that the constrainment current 420 relates to gravity and base acceleration disturbance inputs 435 by:

$$i = \left(\frac{CHP}{1+HPAC}\right)(\ddot{b}-g).\qquad\text{(Equation 6)}$$

The forward loop gain (HPAC) is extremely high, particularly due to the compensation block 415 and the pickoff scale factor 455, within the bandwidth of the accelerometer servo loop, especially at the low frequencies of interest. This is well approximated by $Ai = \ddot{b} - g$, which merely represents that the applied rebalance specific force is equal to the base acceleration minus the gravity disturbance input. Accordingly, by knowing the actuator scale factor in terms of applied force per unit of mass and by measuring constrainment current, a direct measure of the applied rebalance load is obtained.

The accelerometer scale factor is the amount of constrainment current required per unit specific acceleration of the device. This is given by:

$$i = \frac{\ddot{b}-g}{A}.\qquad\text{(Equation 7)}$$

The proper centimeter/gram/second (CGS) unit of acceleration is Gal or cm/s$^2$ and the scale factor is specified as some number of mA per Gal. It is advantageous to have a large scale factor because the physical and electronic implementation invariably corrupts the signals of interest with unwanted noise. With respect to a large scale factor, noise that is additive in nature due to various electronic components is negligible. In other words, large scale factors lead to higher signal to noise ratios (SNR).

Figure 5:
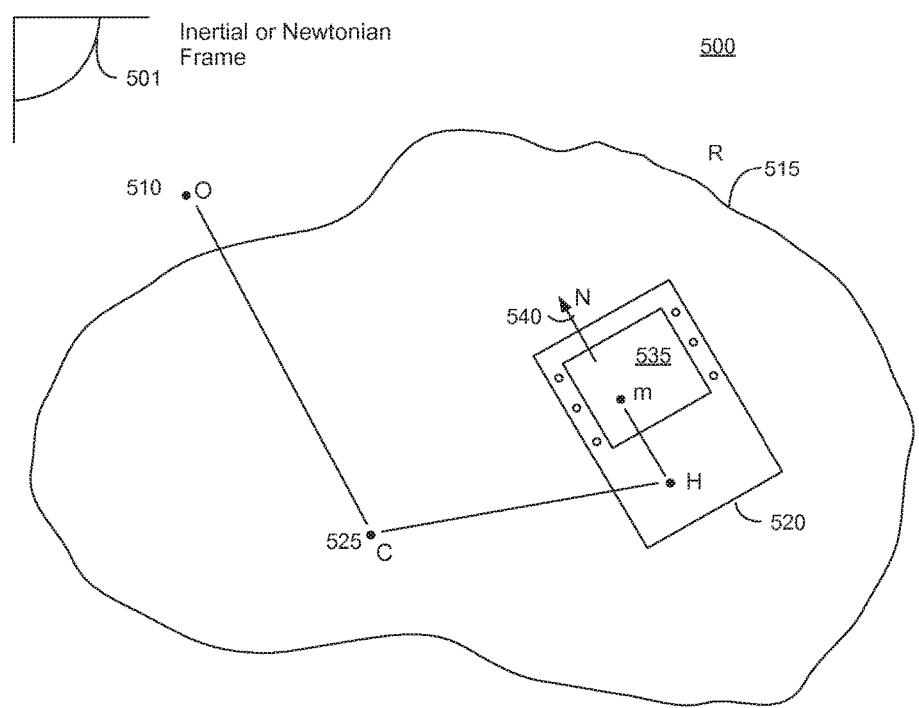
FIG. 5 is a high level schematic view of an accelerometer useful according to an embodiment of the disclosure.

FIG. 5 is a simplified diagram of an accelerometer framework 500. Realistic acceleration environments may be understood with reference to the framework 500 illustrated in FIG. 5. An inertial or Newtonian frame 501 defines a point O 510 which is fixed inertially. A rigid body 515 acts as a moving frame of reference with regard to both rotational and translational motion. An accelerometer housing H 520 is fixed at an offset from a selected point C 525 which is similarly fixed to rigid body 515. The position vector or displacement vector may be denoted $\overline{CH}$. The proof mass m 535 has a single degree of freedom relative to its housing 520. The degree of freedom is indicated by the unit direction vector n 540. For a fully constrained proof mass 535, i.e. within the bandwidth of the accelerometer where relative motion of the proof mass 535 is maintained at null, the proof mass 535 and housing locations 520 are effectively coincident.

An example of realistic disturbance accelerations acting on the proof mass 535 as shown in FIG. 5 includes a global linear acceleration effect $^N a^C$ for the linear or translational vector acceleration a at point "C" 525 of the rigid body 515 relative to the Newtonian frame 501, a global angular acceleration effect $^N\alpha^R \times \overline{CH}$ where $^N\alpha^R$ is the angular acceleration vector of the rigid body 515 relative to the Newtonian reference frame 501, a global centripetal acceleration effect $^N\omega^R \times (^N\omega^R \times \overline{CH})$ where $^N\omega^R$ is the angular rate of the rigid body 515 relative to the Newtonian reference frame 501, and gravity loading on the proof mass 535 g(H). While the above represents some concept of physical/kinematic acceleration disturbances to the accelerometer, it is not exhaustive and many other disturbances also affect the output signal of the accelerometer. In particular, perfect rigidity is only an approximation and the vector CH can never be exactly fixed in R 515. Likewise, no constrainment logic or implementation can perfectly hold a proof mass 535 at its null position, so relative motion between the proof mass and its housing is inevitable. These realities necessitate inclusion of additional disturbance terms such as $^R a^H$ for acceleration of the housing relative to the ideal rigid frame, and $2^N\omega^R \times ^R v^H$ for its Coriolis acceleration.

Of particular interest is the fact that the gravity field (vector) at point "H", denoted g("H") can be written as an expansion of the field at point "C" (likewise denoted g("C") in terms of the gravity vector and successively higher-order spatial derivatives thereof as shown in Equation 8:

$$g(\text{``}H\text{''})=(\text{``}C\text{''})+G_{(2)}(\overline{CH})g_{(2)}(\text{``}C\text{''})+G_{(3)}(\overline{CH})g_{(3)}(\text{``}C\text{''})+G_{(4)}(\overline{CH})g_{(4)}(\text{``}C\text{''})+\qquad\text{(Equation 8).}$$

In this expansion $g_{(j)}$("C") is a vector listing of the (j−1)th order spatial derivatives of the gravity vector evaluated at point "C". Identically, these points are also a vector listing of the j-th order tensor of the gravitational potential evaluated at point "C". Each matrix coefficient $G_{(j)}$ depends on the (j−1)th order products of the location of the accelerometer relative to the chosen point "C".

Figures 6, 7:
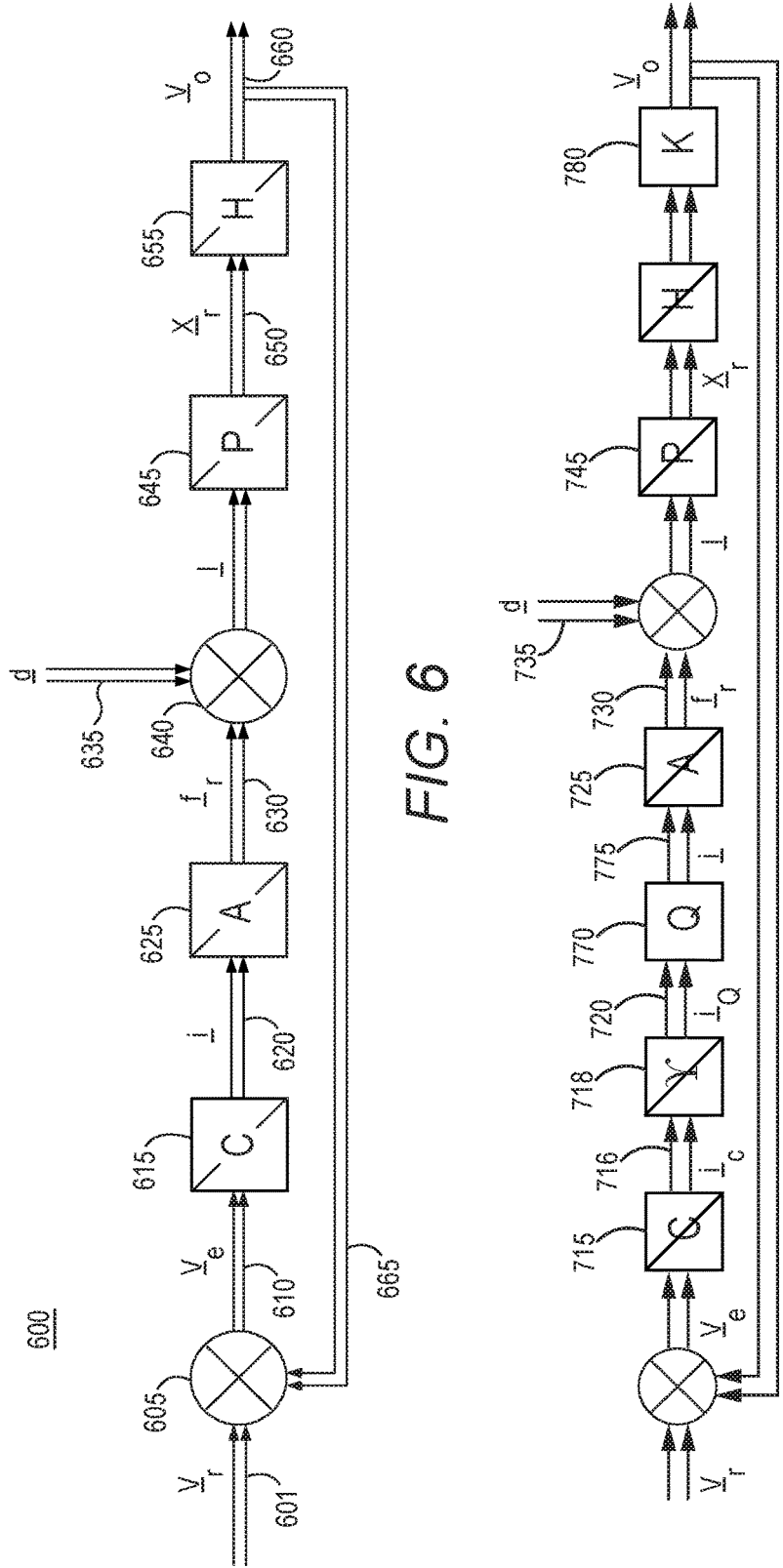
FIG. 6 is a block flow diagram for a rebalancing feedback control function for a plurality of accelerometers according to an embodiment of the disclosure.
FIG. 7 is a block flow diagram of a rebalancing feedback control function for a selected group of accelerometers according to an embodiment of the disclosure.

FIG. 6 is a block diagram showing a feedback mechanism for a group or cluster of accelerometers associated with a GGI according to an embodiment of the disclosure. While FIG. 6 follows a similar process flow as shown in FIG. 4, it should be noted that FIG. 6 depicts a vectorized block diagram in which the signals represented by double arrow represent vector listings of values, and blocks represent processing on diagonal matrices to which the vector listings are applied. The process shown in FIG. 6 thus encapsulates a number of rebalance accelerometers having individual, separate respective feedback servo systems for rebalancing each accelerometer unto itself. All accelerometers are thus mutually decoupled or decentralized from one another (i.e. mechanically, electrically, etc.) except that the accelerometers may be mounted on a common structural member of a GGI.

Continuing the analogy with FIG. 4, now for a group of individual accelerometers on a common structure or block, a vector listing of pickoff voltages 665, each pickoff voltage being proportional to the displacement of a proof mass from null in each accelerometer is subtracted from a reference voltage 601 in comparator 605 to produce a vector listing of error voltages 610 for the accelerometers. The vector of error voltages 610 are input to a constrainment circuit 615 which processes the error voltages to produce a vector listing of constrainment currents 620, one per accelerometer. The constrainment currents 620 are distributed by actuator control circuit 625 to each accelerometer's rebalancing servo to produce a rebalancing force 630 at each accelerometer. The rebalancing forces 630 combine with the base acceleration and gravity gradient 635 or disturbance input as described hereinabove are applied to the group or cluster of accelerometers, denoted as plant 645. The plant 645 (e.g. the group or cluster of accelerometers) produces a vector listing of output signals 650 which are scaled by scaling factor circuit 655 to produce a vector listing output voltages 660 proportional to the displacement of the proof mass in each accelerometer. The output voltages 660 are fed back 665 to produce a subsequent vector listing of error voltages 610.

The disturbance input (d) 635 is likewise a listing of the plant disturbances per each accelerometer taken alone, but wherein each of those now comprises the more general effects described above with regard to FIG. 5. The gravity effect for each accelerometer is expanded about a common point on the rigid frame. Placement and orientation of the individual accelerometers is designed such that certain known summations of accelerometer outputs allow measuring second-order gravity tensor components.

Summations of individual accelerometer outputs inherit the basic scale factor of the accelerometers when decoupled or individually constrained. In a non-limiting embodiment, the processing circuitry is configured to take the difference between outputs of a pair of accelerometers:

$$i_1 - i_2 = \left(\frac{1}{A_1}\right)d_1 - \left(\frac{1}{A_2}\right)d_2 = \frac{1}{A}(d_1 - d_2) \quad \text{(Equation 9)}$$

where it is assumed that scale factors of each accelerometer unit are the same.

Gravity gradients are determined as appropriate differences divided by a characteristic dimension (D), separation, or baseline. Thus, a generic gradient component, $g_{ij}$ may be written:

$$g_{ij} = \frac{d_1 - d_2}{D}. \quad \text{(Equation 10)}$$

Second-order gravity tensor components, or what are more generally referred to as gravity gradients, have units of acceleration divided by distance, (e.g. Gal/cm), which amounts to $1/s^2$. A more common unit used in practice is the Eötvös unit, or simply Eö where 1 Eö equals $10^{-9}$ $1/s^2$. The current difference above can therefore be written in terms of the gravity gradient $g_{ij}$ as:

$$i_1 - i_2 = \frac{D}{A}\frac{(d_1 - d_2)}{D} = \frac{D}{A}g_{ij}. \quad \text{(Equation 11)}$$

The gradient scale factor is the product of the accelerometer scale factor and characteristic dimension of the gradiometer instrument, and has units of mA/Eö. Similar to the discussion above regarding benefits of having a large accelerometer scale factor, it is likewise desirable to have a large gradiometer scale factor. The gradiometer scale factor can be increased by increasing the overall size of the instrument itself, i.e., by increasing the characteristic dimension, or by increasing the underlying scale factor of the accelerometers used to implement the gradiometer.

However, there are drawbacks to increasing the overall size of the gradiometer in an attempt to increase the instrument's scale factor. These drawbacks include greater size, weight, and power to operate the instrument, which in turn result in decreased flight durations possible by an airborne survey provider due to taking on less fuel to offset the increased weight of the instrument, etc. Thus, in the embodiments described herein, the characteristic dimension of the instrument is held fixed, perhaps at some value that is already maximized from practical perspectives.

The scale factors for each of the accelerometers is conveniently stated for the vectorized block diagram by comparison with its scalar counterpart diagram via:

$$i = A^{-1}d \quad \text{(Equation 12)}.$$

Equation 12 represents a single accelerometer's scale factor repeated as many times as there are units used. Because the gradiometer's characteristic dimension is assumed held fixed per the above discussion, increasing a gradiometer's sensitivity calls for increasing the associated accelerometer scale factors.

Since the accelerometer scale factor is the reciprocal of its rebalance actuation scale factor, one consideration might be to decrease the rebalance actuation scale factor, thereby requiring greater current to rebalance disturbance inputs felt by the accelerometer. This turns out to be a good approach for several reasons, a few of which will now be described.

Gradient levels of interest for exploration range roughly from as little as 1 Eö (or even less) up to hundreds of Eö. Examining the characteristic gradient retrieval above, the acceleration difference $d_1 - d_2$ needed to acquire a gradient of 1 Eö given a gradiometer characteristic dimension D equal to $(10^{-9}D)$ Gal, where D is specified in centimeters (cm) for a characteristic dimension of the order of say, 10 cm, requires an acceleration difference of 10 nanoGal (nGal). A rule of thumb for signal acquisition requires individual accelerometer fidelity of the order of 1 nGal to yield this performance on two differing units. One nGal is a miniscule amount. Conversely, an accelerometer simultaneously experiences disturbance inputs approaching 1000 Gal due to use in earth's gravity field, and 100-300 Gal for moderate to severe turbulence conditions in flight. This presents a serious problem of input scales, approaching twelve orders of magnitude difference.

Decreasing an accelerometer's actuation scale factor to increase its sensitivity yields greater amounts of drawn current to balance the sum of all disturbance inputs, including those at the high input levels corresponding to gravity and motion inputs, down to those at low input levels corresponding to sought gradients, and, of course, everything in between.

The potentially high current levels that result, even if they do not exceed the accelerometer's capacity (i.e. plant capacity), still cause very undesirable performance results. A typical arrangement of a rebalance actuator of the accelerometer is such that its proof mass is wound with a conductive coil and the coil-and-mass assembly is positioned in a permanent magnetic field affixed to the housing. As a result, current through the coil experiences electromagnetic force from the permanent field in which it resides, which is nominally proportional to the amount of current supplied. However, the same current through the coil alters the magnetic field in which it resides. For low currents this alteration is nearly negligible and the actuation scale factor is virtually constant over the range of small constrainment currents needed for rebalancing experienced disturbances. Significantly increased currents can have severe detrimental effects of the carefully designed magnetic field and result in significant nonlinearity of scale factor. Practical matters regarding fabrication of the overall device also limit the amount of symmetry achieved in the permanent magnetic field, the coil-and-mass assembly, and its mounting conditions to the base or housing. Strong currents through the coil can greatly exaggerate asymmetric effects as well. Thus, an immediate result of strong currents is degradation of scale factor linearity.

Another immediate undesirable effect attributed to strong currents is degradation of bias stability, i.e., introduction or amplification of accelerometer drift. The electric current through the coil releases heat (Joule heating), the amount of which is proportional to the square of the current. This heat diffuses throughout the delicate pieces comprising the accelerometer and in particular, the proof mass assembly, mounting spring, and base. Unavoidable manufacturing imperfections and asymmetries in mounting springs become exaggerated when experiencing large thermal changes and particularly in the presence of thermal gradients. The net effect is a changed stress condition that acts on the proof mass (i.e., applies a force or torque) showing up as perturbations to the rebalance load required to maintain the proof mass at null even in the absence of disturbance inputs, i.e. drift.

It should be noted that if the rebalance actuator scale factors of a group of accelerometers could be decreased when reacting to gradient disturbance inputs only, as disclosed in this application, then the accelerometers and subsequent gradiometer could have "differentially increased" sensitivity or increased sensitivity to gravity gradient disturbance inputs only. Because the gradient disturbances are so small, huge differential sensitivity increases from such an approach could be had without even coming close to causing the aforementioned problems of scale factor nonlinearity and drift.

The steps for rebalancing an arbitrary number of accelerometers as described hereinabove, may be performed using hardware, software or a combination of hardware and software. Software may be embodied in a non-transitory computer readable medium as instructions for execution by a processor. The processor may be a general purpose processor or other suitable processor which can execute computer instructions.

Referring now to FIG. 7, the feedback control function of FIG. 6 is modified to provide a rebalance current for a multitude of accelerometers used in a GGI according to an exemplary embodiment of the disclosure. It should be noted that the blocks Q and K are added to the function of FIG. 6 and double lines indicate inputs/outputs from a plurality of accelerometers, e.g., vector signal traces. Blocks Q and K represent non-diagonal matrices as explained in greater detail below. The plurality of accelerometers and respective feedback arrangements may be encapsulated in a single vector block diagram (as shown in FIG. 6), wherein each accelerometer "stands alone," or is de-coupled from all other accelerometers associated with the vector block.

In the multiple accelerometer feedback function of FIG. 7, each entry of a vector listing of currents ($\underline{i}_Q$) 720 exiting constrainment block (C) 715 is distributed to any possible number of accelerometers per corresponding constrainment mode. Each constrainment mode is defined by a column entry of the influence or actuation modes matrix (Q) 770. Block Q 770 is an actuation modes matrix representing a constrainment load distribution or coupling block. Based on design of the GGI, the summation coefficients for combining outputs of individual accelerometers that enable gradient retrieval are known (e.g., as part of the instrument design process). A vector listing of these summation coefficients can be used to determine or define a column of the actuations modes matrix Q 770, and the corresponding entry of $i_Q$ 720 that will then supply the rebalance load required for the group of accelerometers in order to balance the respective gradient input of the assembly as a whole. An actuation current $\underline{i}$ 775 is generated based on the rebalance load necessary. The actuation current $\underline{i}$ 775 is applied to the corresponding accelerometer channel via actuator matrix 725 and actuator control circuitry which distributes the actuation current 775 for a particular constrainment mode to each accelerometer associated with the constrainment mode. The actuator matrix 725 provides distributed actuator currents that produce rebalancing force 730 applied to the GGI plant 745 (e.g. group or cluster of accelerometers) as a correction force. In order to ensure that only the channel associated with the assigned column of the actuation modes matrix Q 770 is responsive to the selected gradient input, it is necessary that the remaining columns of Q be mutually orthogonal to the prescribed gradient channel and mutually orthogonal to each other as well. In other words, the columns of the actuation modes matrix Q 770 must form a complete orthogonal basis for actuation wherein each column is a distinct rebalance actuation mode for the group of accelerometers. Using a vector q to denote the listing of summation coefficients, the full set of actuation modes (block Q 770) is completely determined by computing the singular value decomposition of q, and taking the full leading factor of the decomposition as its value where $$q = U\Sigma V^T \qquad \text{(Equation 13)}$$

$$Q = U \qquad \text{(Equation 14).}$$

The distribution block of actuation modes matrix Q 770 is thus not only an orthogonal basis for actuation, but an orthonormal basis where its transpose equals the identity matrix.

$$Q^T Q = I \qquad \text{Equation (15).}$$

Similarly, block K 780 is a non-diagonal matrix of accelerometer pickoff coefficients which forms combinations of individual accelerometer pickoff voltages, having one such combination per rebalance mode or one per servo channel. The same knowledge of accelerometer combinations used to extract gradients using matrix Q 770 indicates that when subjected to a gradient input, the group of accelerometers will exhibit pickoff voltages in that same combination. Therefore, the value of K 780 may be viewed as:

$$K=Q^T \quad \text{(Equation 16)}.$$

This value is advantageous in that it imposes no change to the forward loop gain due to the ortho-normality of Q. As remaining blocks are diagonal with like entries per block, there is no net effect of the two distribution blocks on the forward loop:

$$KQ=Q^TQ=I \quad \text{(Equation 17)}$$

indicating the underlying stability of the control system remains unchanged within the limits of requisite modeling used during initial design of the individual accelerometer feedback loops.

The sensitivity to gradients is increased differentially while sensitivity to remaining disturbances is left unchanged. With this framework in place, current in the channel corresponding to gradient rebalance can be directly attenuated by adding a diagonal block (Y) 718 between the constrainment block C 715 and the actuation modes block Q 770. This amounts to a coordinate scaling by the new block (Y) 718

$$i_Q = \gamma i_C \quad \text{(Equation 18)}$$

where $i_C$ 716 is the vector listing of currents exiting the constrainment block 715, one per actuation mode. Non-gradient channels are merely scaled by unity, whereas gradient channels are attenuated, or scaled by something considerably less than unity. Sensitivities per channel are thus determined from $AQ\gamma i_C = -d$, or upon rearranging, $$i_C = -\gamma^{-1} Q^T A^{-1} d \quad \text{(Equation 19)}$$

where d 735 represents a simplified version of the gravity minus base acceleration (g-b) and includes additional disturbances experienced by an accelerometer as described with regard to FIG. 5.

In this expression, the gradient constraint mode (column of Q) becomes a row of $Q^T$ which represents the original summation of accelerometer outputs needed to rebalance/recover a gradient. That combination is now scaled by the reciprocal of the current attenuation factor applied to the gradient channel by block γ 718, that is, it is amplified. The gradient channel alone is amplified whereas remaining channels are unchanged and thus the objective of differentially amplifying the instrument's sensitivity to sought gradient input is achieved.

To maintain a zero net change to the forward loop gain, the row of K corresponding to the gradient channel should be scaled by these amplification factors so that $$K^T \gamma Q = I. \quad \text{(Equation 20)}.$$

This is easily done by redefining K so that $$\tilde{K} \gamma^{-1} K \quad \text{(Equation 21)}.$$

Since block γ is diagonal, this gives:

$$\tilde{K}^T \gamma Q = K^T \gamma^{-T} \gamma Q = K^T \gamma^{-1} \gamma Q = K^T Q = I \quad \text{(Equation 22)}.$$

The process flow of FIG. 7 provides an actuator modes matrix which defines an orthogonal set of actuation modes that provides rebalancing (actuator) currents for any number of selected groups of accelerometers. The simultaneous processing of actuator currents for multiple modes and the application of the resulting actuator currents to the accelerometers associated with each mode allows the actuator currents to be superimposed on the accelerometers of the GGI as a whole. This provides the ability to apply a rebalancing force to correct noise experienced by the GGI as a whole, while the individual accelerometers are maintained as decoupled by one another.

Figure 8:
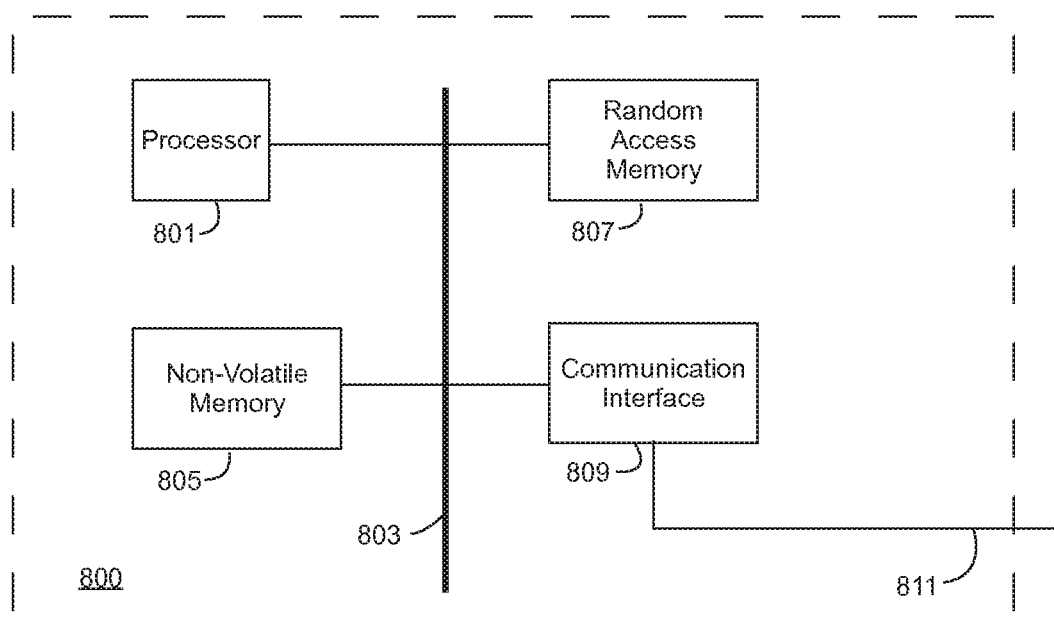
FIG. 8 is an exemplary processing device for use according to an embodiment of the disclosure.

FIG. 8 is a block diagram of a processing device 800 which can be used in an embodiment described in the application. It is understood by one of ordinary skill in the art that the circuitry associated with the processing steps depicted in embodiments of the present invention may be implemented via analog circuitry, digital circuitry, and/or combinations thereof. Such analog circuitry includes one or more analog signal generators and clocks, modulators, demodulators, analog amplifiers and filters, sample and hold circuits, analog-to-digital converters, and the like, as is clear to one of skill in the art. The processing apparatus described in FIG. 8 may be implemented with comparable analog processing devices without departing from the scope of this disclosure.

As shown in FIG. 8, a processor 801 is provided which is configured for receiving executable instructions and executing the instructions. The processor 801 may also receive data or signals from other components in the system via communication bus 803. The processor may perform processing of the data or signals and produce processed data or signals which may be communicated via the communication bus 803 to other system components. The processor 801 is in communication with a non-volatile memory 805 which may by a non-transitory computer readable medium that contains computer instructions. Non-volatile memory 805 is memory configured to store its contents regardless of whether power is supplied to the non-volatile memory 805. Non-volatile memory 805 is in communication with processor 801 via communication bus 803. Random access memory 807 is in communication with non-volatile memory 805 and processor 801 via communication bus 803. Random access memory (RAM) 807 is configured to store instructions or data which may be received and processed by processor 801. RAM 807 provides faster data access than non-volatile memory 805 and is typically used for data processing tasks in cooperation with processor 801 while the processing device is running. A communication interface 809 is in communication with the other components via communication bus 803. The communication interface provides a means for signals and data 811 to be shared with devices in communication with the processing device 800. By way of non-limiting example, the processing device may in communication with a rebalancing accelerometer or arbitrary number of rebalancing accelerometers used as a gravity gradiometer instrument according to an embodiment of the application. The calculations and signals described herein may be passed between the processing device and the GGI to identify the sought gravity gradients measured in the GGI and provide the feedback control necessary to mitigate disturbance or error signals caused by non-gradient acceleration sources.

As discussed hereinabove, it will be clear to one of skill in the art that in addition to the processing apparatus described in FIG. 8, comparable analog processing devices could be used without departing from the scope of this disclosure.

Thus, there is disclosed a system and method of rebalancing a plurality of accelerometers arranged in a gravity gradiometer instrument (GGI), each accelerometer of the plurality of accelerometers being decoupled from each other accelerometer. The system and method comprises: implementing at least one constrainment mode, wherein each of the at least one constrainment mode corresponds to a subset of accelerometers in the plurality of accelerometers. An actuation modes matrix is defined wherein each column of the actuation modes matrix contains a vector listing of summation coefficients for accelerometers of a constrainment mode associated with the column of the actuation modes matrix. A vector listing of constrainment currents is generated for each accelerometer associated with the at least one constrainment mode and the vector listing of constrainment currents is applied to the actuation modes matrix to generate an actuation current for each constrainment mode. The generated actuation current is then applied to each accelerometer associated with the at least one constrainment mode.

In one embodiment, each column in the actuation modes matrix is mutually orthogonal to each other column in the actuation modes matrix.

In one embodiment, generating the vector listing of constrainment currents comprises determining a vector listing of pickoff voltages for a plurality of accelerometers associated with one of the at least one constrainment modes, wherein the pickoff voltages are proportional to the displacement of a proof mass of each accelerometer; subtracting the vector listing of pickoff voltages from a reference voltage to produce a vector listing of error voltages; and applying the vector listing of error voltages to a constrainment circuit to generate the vector listing of constrainment currents for one of the at least one constrainment modes. The constrainment circuit produces a diagonal matrix of constrainment currents for a plurality of constrainment modes. The constrainment current may be attenuated according to a selected constrainment mode by a coordinate scaling circuit Y to produce a vector listing $i_Q$ of constrainment currents for the selected constrainment mode.

In one embodiment, applying a plurality of actuation currents to each accelerometer in the GGI, thereby superimposing the actuation currents of a plurality of constrainment modes to the GGI as a whole, provides a rebalancing force for all accelerometers in the GGI, wherein each accelerometer is decoupled from each other accelerometer in the GGI.

In one embodiment, applying a vector listing of actuation currents, each actuation current corresponding to a constrainment mode, to an actuation control circuit, the actuation control circuit providing each actuation current to a rebalancing servo of each accelerometer associated with the constrainment mode corresponding to each actuation current for producing a rebalance force for each accelerometer associated with each constrainment mode. Each actuation current of the vector listing of actuation currents may comprise a single current value that is applied to a plurality of accelerometers defining the constrainment mode.

In one embodiment, there is disclosed a non-transitory computer readable medium upon which are stored instructions, the instructions when executed by a processor cause the processor to perform rebalancing of a plurality of accelerometers arranged in a gravity gradiometer instrument (GGI), where each accelerometer of the plurality of accelerometers being decoupled from each other accelerometer. The processor may perform the steps of: implementing at least one constrainment mode, wherein each of the at least one constrainment mode corresponds to a subset of accelerometers in the plurality of accelerometers; defining a actuation modes matrix, each column of the actuation modes matrix containing a vector listing of summation coefficients for accelerometers of a constrainment mode associated with the column of the actuation modes matrix; generating a vector listing of constrainment currents for each accelerometer associated with the at least one constrainment mode and applying the vector listing of constrainment currents to the actuation modes matrix to generate an actuation current for each at least one constrainment mode; and applying the generated actuation current to each accelerometer associated with the at least one constrainment mode.

Instructions are stored that when executed by the processor cause the processor to produce a diagonal matrix of constrainment currents for a plurality of constrainment modes. Further instructions are stored that when executed by the processor cause the processor to attenuate a constrainment current corresponding to a selected constrainment mode by a coordinate scaling circuit $\gamma$ to produce a vector listing $i_Q$ of constrainment currents for the selected constrainment mode.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A system comprising:
    a gravity gradiometer instrument (GGI) comprising a plurality of rebalancing accelerometers, each rebalancing accelerometer of the plurality of rebalancing accelerometers being decoupled from each other rebalancing accelerometer;
    a comparator circuit configured to receive a reference voltage and a vector listing of pickoff voltages, each pickoff voltage being associated with one of the plurality of rebalancing accelerometers wherein each pickoff voltage is subtracted from the reference voltage to produce a vector listing of error voltages for a set of associated rebalancing accelerometers of the plurality of rebalancing accelerometers;
    a constrainment circuit configured to receive the vector listing of error voltages and to produce a vector listing of constrainment currents, each constrainment current corresponding to a corresponding associated rebalancing accelerometer of the set of associated rebalancing accelerometers and representing a rebalancing current that, when applied to a rebalancing servo of the corresponding associated rebalancing accelerometer, generates a rebalance force in the corresponding associated rebalancing accelerometer;

an actuator control circuit configured to distribute each constrainment current of the vector listing of constrainment currents to the corresponding associated rebalancing accelerometer;

a scaling factor circuit configured to receive an output signal from each rebalancing accelerometer in the set of associated rebalancing accelerometers and produce a vector listing of output voltages proportional to a displacement of a proof mass of each rebalancing accelerometer in the set of associated rebalancing accelerometers; and a feedback circuit configured to apply the vector listing of output voltages to the comparator circuit.

2. The system of claim 1 further comprising a non-diagonal actuation matrix Q of coefficients, wherein each column of a plurality of columns of the actuation matrix Q contains a plurality of summation coefficients, each summation coefficient associated with one of the plurality of rebalancing accelerometers, and wherein a group of rebalancing accelerometers associated with the plurality of summation coefficients in a column of the actuation matrix Q defines a constrainment mode for a subset of rebalancing accelerometers in the plurality of rebalancing accelerometers, wherein the vector listing of constrainment currents is applied to a column of summation coefficients of the actuation matrix Q, the column of summation coefficients corresponding to a constrainment mode containing the corresponding rebalancing accelerometers in the vector listing of constrainment currents, to produce an actuation current to be applied to each of the corresponding rebalancing accelerometers in the constrainment mode.

3. The system of claim 2 wherein the columns of summation coefficients in the actuation matrix Q are mutually orthogonal.

4. The system of claim 2 wherein a diagonal matrix of coordinate scaling factors is applied to the vector listing of constrainment currents output by the constrainment circuit, and wherein the coordinate scaling factors attenuate gradient channels of a corresponding constrainment mode.

5. The system of claim 2 wherein the vector listing of output voltages from each rebalancing accelerometer of the set of associated rebalancing accelerometers are applied to a non-diagonal matrix K of accelerometer pickoff coefficients for a corresponding constrainment mode, to generate individual accelerometer pickoff voltages for the corresponding constrainment mode, wherein: $K=Q^T$.

6. The system of claim 1 wherein each rebalancing accelerometer of the plurality of rebalancing accelerometers is in the set of associated rebalancing accelerometers.

7. The system of claim 1 wherein the set of associated rebalancing accelerometers is a subset of the plurality of rebalancing accelerometers.

8. A method comprising:

receiving, by a comparator circuit, a reference voltage and a vector listing of pickoff voltages, each pickoff voltage being associated with one of a plurality of rebalancing accelerometers in a gravity gradiometer instrument (GGI), each rebalancing accelerometer of the plurality of rebalancing accelerometers being decoupled from each other rebalancing accelerometer;

subtracting each pickoff voltage from the reference voltage to produce a vector listing of error voltages for a set of associated rebalancing accelerometers of the plurality of rebalancing accelerometers;

receiving, by a constrainment circuit, the vector listing of error voltages;

based on the vector listing of error voltages, producing, by the constrainment circuit, a vector listing of constrainment currents, each constrainment current corresponding to a corresponding associated rebalancing accelerometer of the set of associated rebalancing accelerometers and representing a rebalancing current that, when applied to a rebalancing servo of the corresponding associated rebalancing accelerometer, generates a rebalance force in the corresponding associated rebalancing accelerometer;

distributing, by an actuator control circuit, each constrainment current of the vector listing of constrainment currents to the corresponding associated rebalancing accelerometer;

receiving, by a scaling factor circuit, an output signal from each rebalancing accelerometer in the set of associated rebalancing accelerometers;

based on the output signal from each rebalancing accelerometer in the set of associated rebalancing accelerometers, producing, by the scaling factor circuit, a vector listing of output voltages proportional to a displacement of a proof mass of each rebalancing accelerometer in the set of associated rebalancing accelerometers; and applying, by a feedback circuit, the vector listing of output voltages to the comparator circuit.

9. The method of claim 8 wherein each rebalancing accelerometer of the plurality of rebalancing accelerometers is in the set of associated rebalancing accelerometers.

10. The method of claim 8 wherein the set of associated rebalancing accelerometers is a subset of the plurality of rebalancing accelerometers.

* * * * *